E. L. SHERBONDY.
TIRE FILLER.
APPLICATION FILED DEC. 4, 1915.

1,193,196.

Patented Aug. 1, 1916.

Inventor
Edward L. Sherbondy
by Townsend, Graham & Harris
his Attorneys

UNITED STATES PATENT OFFICE.

EDWARD L. SHERBONDY, OF LOS ANGELES, CALIFORNIA, ASSIGNOR TO AERO-CUSHION TIRE COMPANY, OF SAN JOSE, CALIFORNIA, A CORPORATION OF NEVADA.

TIRE-FILLER.

1,193,196.

Specification of Letters Patent.

Patented Aug. 1, 1916.

Application filed December 4, 1915. Serial No. 65,133.

*To all whom it may concern:*

Be it known that I, EDWARD L. SHERBONDY, a citizen of the United States, residing at Los Angeles, in the county of Los Angeles and State of California, have invented a new and useful Tire-Filler, of which the following is a specification.

My invention relates to tire fillers. It is the present practice in pneumatic tires to provide an outer casing in which an inner tube is placed, this inner tube being inflated with compressed air and the compressed air being depended upon to give resiliency to the complete tire.

The principal object of my invention is to provide a filler which may be placed inside the casing of a pneumatic tire and which will be a full equivalent to the inner tube and the compressed air contained therein. To make such a tire filler a practical success, it has been necessary for me to develop a new composition of matter which will be hereinafter explained.

Figure 1:
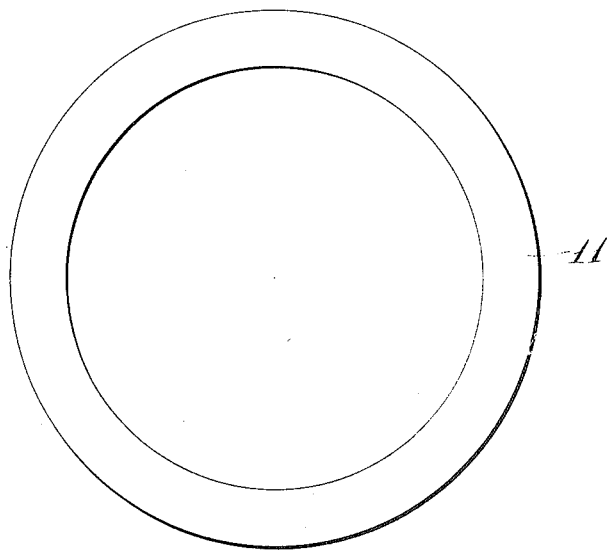
Figure 2:
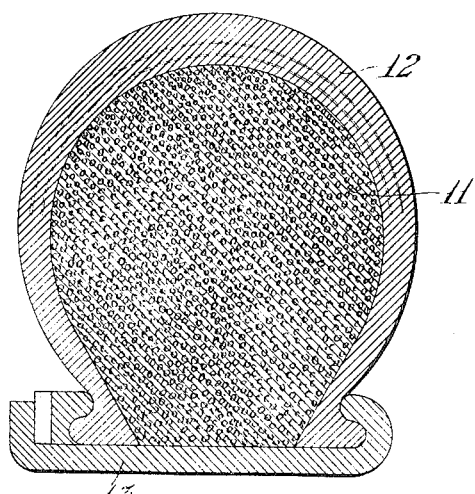

The method of using my invention will be better understood by a reference to the accompanying drawing which is for illustrative purposes only, in which:

Figure 1 is a view of the completed tire filler, and Fig. 2 is a cross section of an outer casing with the tire filler in place therein.

As shown in these drawings, the tire filler 11 is a ring of my new composition of matter, this ring being placed inside an outer casing 12 which is secured on the felly 13 of a wheel. The filler 11 is used as a substitute for the ordinary inner tube and the compressed air which is ordinarily carried therein. Such a filler has very decided advantages over an inner tube with compressed air in that it is permanent and will not blow out or puncture, so that one great source of annoyance to automobile owners is done away with. When such a filler is used the outer casing may be worn to a degree absolutely impractical with ordinary pneumatic tires so that double or treble mileage may be obtained from such a casing. To be a success, such a filler must have certain characteristics which are extremely difficult to obtain. In the first place, it must be fully as elastic as compressed air, and must have great durability so that it will stand the repeated flexing and bending, to which it is subjected, without deterioration. It must also be very light, and to be a commercial success it must be very low in first cost. It must be so constituted that it will return to its original form after being flexed and it must be quite stiff so that it will resist the tendency to change form in approximately the same degree that compressed air does. I have invented a composition of matter which has all of the above advantages, said composition consisting of solid elastic material having a plurality of small air or gas cells formed therein. These gas cells are regularly disposed throughout the mass of the material and are one-sixteenth of an inch or less in diameter.

The composition of matter consists essentially of rubber, a filler for the purpose of decreasing the cost and weight and increasing the wearing qualities of the rubber, a vehicle for said filler, gas making material for the purpose of forming the gas bubbles, and a suitable vulcanizing material. For a filler I prefer to use infusorial earth, as this material is light, very permanent in its nature, very finely divided, and quite cheap. Any other material having these characteristics may be used if desired. As a vehicle I prefer to use rosin oil, this giving the best results, although other heavy oils, such as boiled linseed oil, or rape seed oil, may be used if desired. As a gas making material, I prefer to use carbonate of ammonia and baking soda, although other materials which would produce a gas when heated may be substituted therefor. As a vulcanizing material, sulfur is used and slaked lime is also added to the composition. The air slaked lime tends to correct any tendency for the composition to become acid.

The method of making up the composition is as follows: The filler, the vehicle, the vulcanizing material, and the gas making material are mixed up together in any suitable receptacle, and are then kneaded into the rubber by any of the various mechanical methods now in use in the rubber factories. After having been kneaded into the rubber, the composition is formed into a long cylinder of approximately the diameter of the filler, and this cylinder is placed in suitable molds so that it takes the form of a complete ring, as shown in Fig. 1. It is then heated to vulcanize it and form the gas bubbles and is ready for use in the tire. In practice, the filler is made slightly larger in area than the internal area of the casing in which it is to be placed, the casing being forced in place so that the filler is under some initial tension.

I prefer to mix my ingredients in the following proportions. Raw rubber thirty-four pounds, infusorial earth fourteen pounds, rosin oil one pint, flour of sulfur four pounds, air slaked lime four ounces, carbonate of ammonia two pounds, baking soda one pound.

By the use of this composition of matter a tire filler is produced which has been found in practice to be equal or superior to a pneumatic tire in its physical characteristics, this filler being permanent, durable, light, and low in first cost.

I claim as my invention:—

A composition of matter comprising raw rubber thirty-four pounds, infusorial earth fourteen pounds, rosin oil one pint, flour of sulfur four pounds, air slaked lime four ounces. carbonate of ammonia two pounds, baking soda one pound.

In testimony whereof, I have hereunto set my hand at Los Angeles, California, this 27th day of November, 1915.

EDWARD L. SHERBONDY.